April 8, 1958 R. C. TUTTLE 2,829,461
DEVICES FOR SUPPORTING FISH LURES AND/OR
PROTECTING FISH HOOKS
Filed July 9, 1956 2 Sheets-Sheet 2
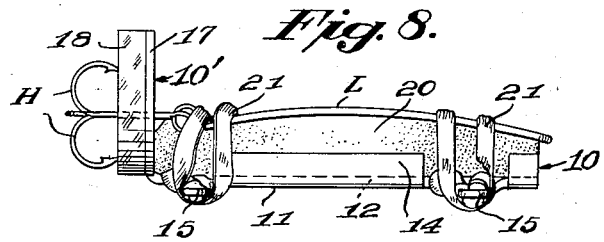
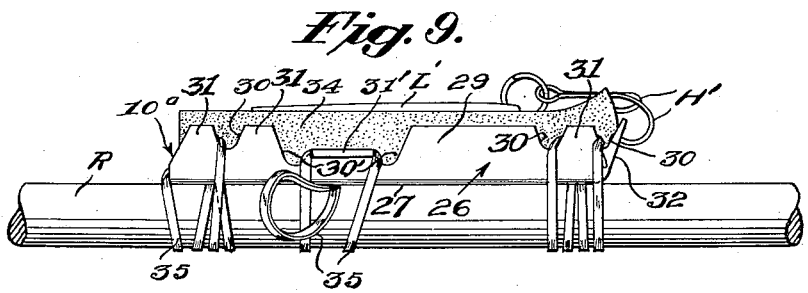
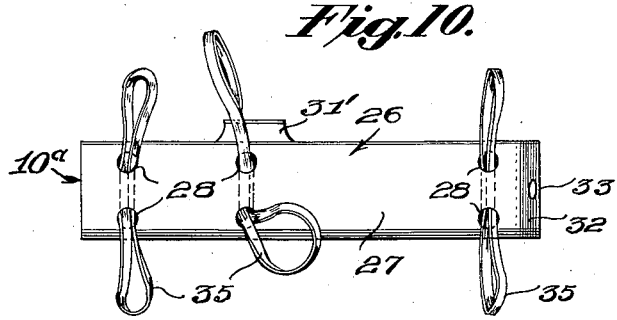
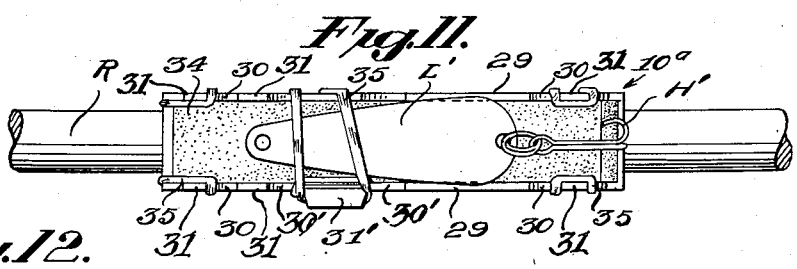
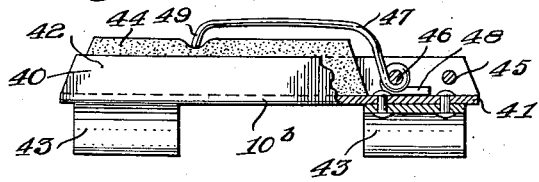
INVENTOR
Richard C. Tuttle
BY
ATTORNEY

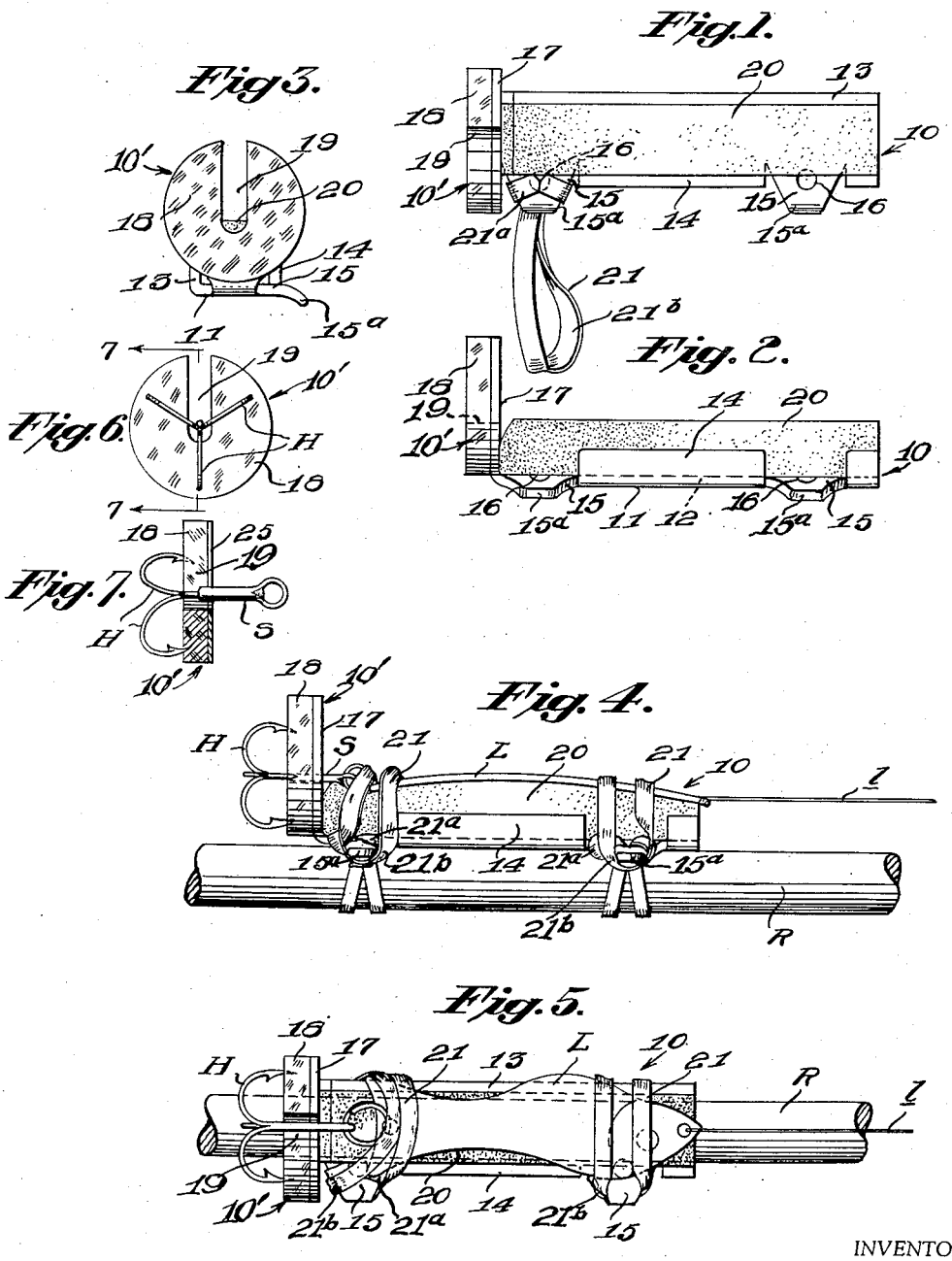

United States Patent Office 2,829,461
Patented Apr. 8, 1958

2,829,461

DEVICES FOR SUPPORTING FISH LURES AND/OR PROTECTING FISH HOOKS

Richard C. Tuttle, Salida, Colo.

Application July 9, 1956, Serial No. 596,526

10 Claims. (Cl. 43—25.2)

This invention relates to devices for carrying or supporting fishing lures and/or hooks and more particularly to devices for protecting gang hooks and for supporting lures if attached to such hooks.

A primary object of the invention is to provide a device for supporting or carrying fish lures having hooks, especially gang hooks, projecting therefrom when they are not in use and which device is capable of supporting a lure and attached hooks on a fishing rod or in a position removed from the rod.

Another object of the invention is to provide a fishing lure and hook retaining device which includes a yieldable lure supporting base.

Still another object of the invention is to provide a fishing lure and hook supporting device having resilient or elastic means for holding the lure on the base and which means may be extended about a fishing rod for holding the device thereon.

A further object of the invention is to provide a hook retaining device which includes means engageable by the points of the hooks for supporting and protecting the hooks.

A still further object of the invention is to provide a device for retaining a fishing lure provided with a gang hook which device includes elastic means engageable with a fishing rod for holding the device thereon, and other elastic means engageable with the lure, for holding same on the device, said device including means for shielding the hooks.

A still further object of the invention is to provide hook retaining and shielding means which may be embodied in a separate article or operatively associated with a lure retaining device.

Yet another object of the invention is to provide a lure and/or gang hook supporting and protecting device having simplicity of design, economy of construction and efficiency in operation.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings wherein like reference characters indicate like parts through the several figures and in which:

Fig. 1 is a top plan view of the improved lure retaining device in accordance with one embodiment of the present invention and wherein one of the resilient retaining bands is omitted for greater clarity of illustration;

Fig. 2 is a side elevational view of the device shown in Fig. 1 with the retaining bands omitted;

Fig. 3 is an end elevational view of the device shown in Figs. 1 and 2;

Fig. 4 is a side view in elevation of a fragment of a fishing rod with the retaining device shown in Figs. 1–3 mounted thereon and supporting a lure with a gang hook;

Fig. 5 is a top plan view of the structure shown in Fig. 4;

Fig. 6 is an end elevational view of a gang hook supporting and shielding device in accordance with the present invention;

Fig. 7 is a vertical sectional view as observed in the plane of line 7—7 on Fig. 6;

Fig. 8 is a side elevational view of the device as shown in Fig. 4 but removed from a fishing rod and serving to protectively support a lure and gang hook;

Fig. 9 is a side elevational view of a modified embodiment of the invention;

Fig. 10 is a bottom plan view of the device shown in Fig. 9 and illustrating the base securing and lure retaining resilient bands secured thereto;

Fig. 11 is a top plan view of the structure shown in Fig. 9, and

Fig. 12 is a side elevational view, partially broken away, of a modification.

Referring now in detail to the drawings, specifically to Figs. 1 to 5 thereof, R designates a fishing rod, a fragment only of which is shown, and 10 designates one embodiment of the improved device for securing a fishing lure L thereto. The device 10 is especially adapted for spinning lures of the general type shown and the lure may be secured to a line $l$ and be provided with a gang hook H. The hook H is shown as comprising a gang of three hooks or prongs but, obviously, it may comprise a single hook of more or less than three prongs.

The retaining device 10, in accordance with this structural embodiment, includes a channel base 11, preferably formed of a light metal such as aluminum but may be molded of thermoplastic or formed of other materials. The channel base 11 includes a bottom wall 12 and opposite side flanges 13 and 14, the flange 14 being incised adjacent each end at two spaced points and the material between each of the two spaced points is bent outwardly and downwardly and formed into lugs 15, each of which is provided with an aperture 16. Rigid with one end of the base 11 is a hook retaining member 10' including a generally vertical plate 17 fixed to the base 11 and to the outer wall of which is suitably secured a layer or disc-like element 18 of approximately the same diameter as the plate 17, the plate 17 and disc 18 preferably being circular, but may have other configurations, and being jointly provided with a radial slot 19 which preferably opens through the upper edges thereof. The disc 18 is formed of a penetrable material such as cork, rubber, felt or the like, capable of being embedded by and protectively retaining and supporting the prongs of the hook H. A cushion pad or block 20 of sponge rubber or other soft material is disposed within the channel base 11 and suitably secured thereto as by means of adhesive.

The lugs 15 are turned outwardly and their outer ends 15a are turned downwardly as is clearly shown in Fig. 3, and a resilient retaining member 21 is secured to each lug 15. The retaining members 21 are preferably in the form of rubber bands which are secured to the lugs 15 by first threading one end 21a of each band 21 in flattened state through a respective aperture 16 and thereafter threading the other end 21b of the band 21 through the one end 21a whereby the one end 21a of the band is secured to the lug as shown in Fig. 1, while the major portion of the band is in the form of a relatively long free loop terminating in the end 21b, as shown in Fig. 1. Each lug 15 is, of course, provided with a resilient retaining member 21 as is clearly indicated in Figs. 4 and 5.

When it is desired to attach the lure supporting device 10 to the fishing rod R, it is necessary only to lay the bottom wall 12 of the device 10 upon the rod R with the resilient loop members 21 projecting outwardly from one side of the rod, in the manner indicated in Fig. 1 with respect to the single loop member shown. With the device 10 laid on the rod, the lure L is positioned on top of the block or pad 20 with the hook shanks disposed within the slot 19, the lure L then being drawn forwardly sufficiently to embed the points of the hook H within the outer wall of the disc 18, as indicated in Figs. 4 and 5, whereby the points are shielded against injury either to the hooks or to the fisherman.

With the lure thus positioned, the loop members 21 are drawn under the base 11 in surrounding relation to the rod R and thence over the lure L and then the bights of the ends 21b thereof are respectively engaged over the outer downwardly curved end portions 15a of the lugs 15 as is clearly indicated in Figs. 4 and 5. When it is desired to use the lure, it is necessary only to slip the loop end portions 21b off the lugs, whereafter the hook H is moved slightly rearwardly to disengage the prongs thereof from the disc 18. The device 10 per se may then be placed in a kit or the fisherman's pocket, or the loop ends 21b slipped over the lug ends 15a to retain the device on the rod.

While, in accordance with Figs. 4 and 5, the resilient bands are extended around the fishing rod as well as the lure L, these bands may be extended around the channel base 11 only, as indicated in Fig. 8, whereby the lure L and hook H may be carried separately of the rod.

While the hook retaining and supporting member 10' is shown as an integral part of the lure retaining device 10, this member advantageously may be embodied in a separate element, as illustrated in Figs. 6 and 7, for protectively supporting a hook H, especially a gang hook, so that the hook may be carried conveniently in a kit or even in a fisherman's pocket since in such an element, the point or points of the hook H are shielded or guarded. In this form, the penetrable layer or disc-like elements 18 are provided with relatively thin backing plates 25 of metal, plastic, fibre board or other relatively impenetrable material that will prevent the points from passing completely through the member.

A modified embodiment 10a of the combined lure and hook retaining device is shown in Figs. 9, 10 and 11, and this structure provides for removable connection of the device with the fishing rod as well as removable retention of the lure and hook on the device without removal of the device from the rod. The modified form of device comprises a channel base 26 whose bottom wall 27 is provided with three longitudinally spaced pairs of apertures 28 with the apertures of each pair in laterally spaced relation, as is clearly indicated in Fig. 10. The side flanges 29 of the base are provided with transversely aligned notches 30 and 30', the notches 30' being slightly deeper than the notches 30, said notches forming lugs 31 and 31' therebetween with the lugs between the notches 30' being longer and one of said longer lugs 31' being bent outwardly.

As as alternative to the hook supporting element 10', the bottom wall 27 is shown as being inclined upwardly at one end of the base to form an end wall 32 and this end wall is provided with one or more hook receiving apertures 33. A sponge rubber block 34 is disposed within the channel of the base 26 and normally projects above the flanges 29, as indicated in Fig. 9, and upon which the lure L' is supported, this lure being shown as having a gang hook H' including two points. A resilient member or rubber band 35 is threaded through each pair of apertures 28 with the central portion thereof supported on the upper face of the bottom wall 27 of the base 26 and between said bottom wall 27 and the pad 34.

With this construction, the base 26 is removably retained on the rod R by the opposite end bands 35, whose opposite ends are extended around under the rod in directions away from the respective apertures 28 and engaged with the projections or lugs 31 intermediate the recesses 30 in the side flanges, as is clearly indicated in Figs. 9 and 11. Also, one end of the central band is extended around under the rod R and looped over the lug 31'. The opposite looped end of the central band is shown free in Fig. 9 whereupon the lure L' may be positioned on the rubber block 34 or removed therefrom.

In order to removably hold the lure in position on the block 34, it is necessary only to swing such free end of the band around under the rod R and over the lure whereupon it is engaged with the lug 31', as is indicated in Fig. 11. Upon placement of the lure L' on the block 34, one point of the hook H' is engaged within the aperture 33 while the other hook point passes over the end wall 32 and is entered into the block 34 whereby the points of the hooks are guarded. This modified device may also be used for retention of lures and hooks independently of the rod R.

Still another modified embodiment 10b of the combined lure and hook retaining device is shown in Fig. 12, this embodiment employing resilient or spring retaining means rather than elastic means such as the rubber bands employed in the previously described modifications. According to this modification, a channel base 40 has a bottom wall 41 with spaced side flanges 42 and spring clip means 43, preferably in the form of two U-shaped springs of well-known design respectively adjacent each end, secured to the bottom wall 41 for removably attaching the device to a rod. A sponge rubber or like pad 44 is disposed within the channel base 40, but this pad preferably terminates short of one end of the base. A pair of cross-pins 45 and 46 span the base side flanges 42 beyond the end of the pad 44, the pin 45 being adjacent the end of the base and forming a hook retainer as an alternative of the retainer 10'.

A spring lure retainer 47 in the form of a spring strip or wire has one end portion 48 coiled around the other pin 46 with the end thereof bearing under tension on the bottom wall 41 and biasing the opposite end portion 49 of the spring retainer 47 down onto the pad 44. The end portion 49 of the spring retainer 47 preferably is bent inwardly or downwardly toward the pad 44, as shown. Preferably, the retainer 47 is formed by a U-shaped wire, the bight portion of which forms the end 49 and the two arms of which are wrapped around the cross-pin 46 adjacent opposite sides of the base. Obviously, the hook retaining pin 45, or a hook retainer 10', can be at the opposite end of the base 40 from the spring supporting pin 46.

In the use of this latter modification 10b, the spring clip means 43 is clipped onto a fishing rod in the usual manner, when desired, and for supporting a lure, the end 49 of the spring retainer 47 is lifted from the pad 44, the lure is disposed on the pad under the end 49 and the lure hook is hooked around the pin 45 after which the end 49 is released to resiliently bear on the lure to retain it on the pad 44. Obviously, this device 10b can be employed for supporting and carrying a lure in a kit or pocket without attachment to a rod.

Although certain specific embodiments of the invention have been shown and described, it is obvious that many modifications thereof are possible. The invention, therefore, it is not to be restricted except insofar as is necessitated by the prior art and by the spirit of the appended claims.

That which is claimed as new is:

1. A device for retaining a fishing lure provided with a hook projecting rearwardly therefrom, comprising an elongated base member of a size approximating that of a lure, a cushion block mounted on the base member and adapted to support a lure on the outer wall thereof, hook guarding means at one end of said base member, and means for releasably retaining a lure on said cushion block and for releasably securing said base member on a fishing rod.

2. A device according to claim 1 wherein said retaining means is resilient.

3. A device according to claim 2 wherein said resilient retaining means comprises a spring lever for retaining the lure.

4. A device according to claim 2 wherein said resilient retaining means comprises an elastic band.

5. A device according to claim 4 wherein said base member comprises an outwardly extending lug on one side of said base member, said elastic band retaining means comprising an elongated, resilient loop member having the intermediate portion thereof secured to said base member, and the opposite end portions of said loop being extendable in opposite directions for releasable engagement of the opposite ends with said lug.

6. A device according to claim 4 wherein said base member is provided with hooked lugs at one side thereof, said elastic band comprising a loop member for each of said lugs, each of said elastic loop members having a portion thereof secured to one of said lugs, each of the loop members being adapted to encompass said base member, cushion block, and lure and the opposite free portion of each of said loop members being releasably engageable with its hooked lug.

7. A device according to claim 6 wherein said hook guarding means comprises a disc-like element of penetrable material provided with an upwardly opening slot adapted to receive the shank of the hook, points of said hook being engageable within said element when the lure is in retained position.

8. A device of the kind described and for the purpose set forth, comprising an elongated channel base member, a hook point guarding disc-like element projecting upwardly from one end of said base member and having a vertical slot opening through the upper edge thereof, a lure supporting cushion disposed on said base member for supporting a lure having a hook whose shank is receivable within said slot and whose points are engageable within the outer wall of said disc-like element, and yieldable means having corresponding portions thereof secured to said member at one side thereof, and lug means on said base member on at least said one side thereof for releasable engagement of the opposite portions of said yieldable means therewith.

9. The structure according to claim 8 wherein said hook guarding disc-like element is of cork, and a metallic disc projecting upwardly from said one end of the base member in backing relation to said cork element.

10. A device for supporting a lure having a pair of hooks and for removably mounting the same on a fishing rod, comprising an elongated channel base having longitudinally spaced pairs of laterally spaced apertures in the bottom wall thereof, elongated elastic bands each having the medial portion thereof threaded through a pair of said apertures, said base including side flanges having longitudinally spaced projections thereon and one of said flanges being provided with a laterally outwardly projecting lug, a cushion member disposed on said base between said flanges for supporting a lure on the upper face thereof, hook guarding means at one end of said base, the opposite end portions of certain of said bands adapted to be directed in opposite directions under said base and around a rod and engaged with corresponding ones of said projections for retaining said base on the rod, one end portion of one of said bands adapted to be extended under said rod and engaged with said lug, the opposite end portion of the last named band adapted to be extended under said rod and over said cushion and lure for retaining the lure on the cushion.

References Cited in the file of this patent

UNITED STATES PATENTS

| 588,101 | Coudun | Jan. 26, 1925 |
| 592,547 | Societe | May 1, 1925 |
| 2,364,807 | Nelson | Dec. 12, 1944 |
| 2,608,459 | Malmquist | Aug. 26, 1952 |
| 2,691,840 | Smith | Oct. 19, 1954 |
| 2,700,787 | Trapanese | Feb. 1, 1955 |

FOREIGN PATENTS

| 588,101 | France | Jan. 26, 1925 |
| 592,547 | France | May 1, 1925 |